(12) United States Patent
Shum et al.

(10) Patent No.: US 7,408,545 B1
(45) Date of Patent: Aug. 5, 2008

(54) METHOD AND SYSTEM FOR RENDERING CONCENTRIC MOSAICS

(75) Inventors: Heung-Yeung Shum, Beijing (CN); Min-Sheng Wu, Beijing (CN); Hong-Hui Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,828

(22) Filed: Apr. 28, 2000

(51) Int. Cl.
*G06T 17/00* (2006.01)

(52) U.S. Cl. ...................... 345/419; 382/294

(58) Field of Classification Search ............... 345/419, 345/428, 552, 581, 582, 568, 587; 382/154, 382/284, 294
See application file for complete search history.

(56) References Cited

U.S. PATENT DOCUMENTS 6,078,701 A * 6/2000 Hsu et al. ............... 382/154

OTHER PUBLICATIONS

S.E. Chen, QuickTime VR—An Image-based Approach to Virtual Environment Navigation, *SIGGRAPH 95*, pp. 29-38, Aug. 1995.
S.E. Chen and L. Williams, View Interpolation for Image Synthesis, *SIGGRAPH 93*, pp. 279-288, Aug. 1993.
S.J. Gortler et al., The Lumigraph, *SIGGRAPH 96*, pp. 43-54, Aug. 1996.
M. Levoy and P. Hanrahan, Light Field Rendering, *SIGGRAPH 96*, pp. 31-42, Aug. 1996.
L. McMillan and G. Bishop, Plenoptic Modeling; An Image-based Rendering System *SIGGRAPH 95*, pp. 39-46, Aug. 1995.
J. Shade et al., Layered Depth Images, *SIGGRAPH 98*, pp. 231-242, Jul. 1998.
R. Szeliski and H.Y. Shum, Creating Full View Panoramic Image Mosaics and Environment Maps, *SIGGRAPH 97*, pp. 251-258, 1997.
H.Y. Shum and W. He, Rendering with Concentric Mosaics, *SIGGRAPH*, pp. 299-306, Aug. 1999.
E.H. Adelson and J. Bergen, The Plenoptic Function and the Elements of Early Vision, *Computational Models of Visual Processing*, pp. 3-20, MIT Press, 1991.
S. Peleg and M. Ben-Ezra, Stereo Panorama with a Single Camera, *Proc. Conference on Computer Vision and Pattern Recognition Conference*, 1999.

* cited by examiner

*Primary Examiner*—Almis R. Jankus
(74) *Attorney, Agent, or Firm*—Lee & Hayes, PLLC (57) ABSTRACT

With an image-based rendering (IBR) system based on linear interpolated concentric mosaics, an observer is able to wander through a real or synthesized scene and have new view images (optionally including stereo images) of the scene rendered as the observer moves. According to one embodiment, multiple viewing rays are extended in a viewing direction from the image to be rendered at a view point. For viewing rays that do not coincide with captured images, an image is generate based on the captured images. The image is generated by interpolating between at least two captured images based on a constant distance to objects in the scene. The view images that are displayed can be mono or stereo (e.g., simulating a pair of eyes of the observer).

57 Claims, 9 Drawing Sheets

METHOD AND SYSTEM FOR RENDERING CONCENTRIC MOSAICS

TECHNICAL FIELD

The invention is related to an image-based rendering (IBR) system and method for rendering novel views of a 3D scene, including a stereo IBR system and method based on linear interpolated concentric mosaics.

BACKGROUND OF THE INVENTION

The ability to wander in a realistic 3D scene is attractive to a wide variety of people, ranging from scientists to kids. A significant problem to allowing such wandering is easy construction and real time rendering of complex 3D scene data. Traditional approaches often involve constructing or recovering a complete geometric and photometric model of the 3D scene by using modeling or vision techniques. Then, simulating the flow of light from a source, the light is reflected from the described model into a simulated camera and onto a film plane to produce an image. Such approaches are attractive as they allow various graphic elements, such as new objects, lights and shadows, to be readily added to the rendered scene. However, typically these approaches are also complex and computationally intensive. For most of the complex scenes, real time systems based on this approach are typically not able to run on high performance graphics workstations, much less typical desktop or portable computers.

Another approach that is becoming increasingly popular is referred to as image based rendering (IBR). In IBR, the 3D scene is represented by a plenoptic function, such as is described by E. H. Adelson and J. Bergen in "The plenoptic function and the elements of early vision", *Computational Models of Visual Processing*, pp. 3-20, MIT Press, Cambridge, Mass., 1991. The plenoptic function is constructed discretely by integrating images captured at a set of viewpoints and viewing directions. While rendering, novel views are generated by re-sampling the pre-constructed plenoptic function at given points, along certain paths. Unfortunately, the 7D plenoptic function described by Adelson and Bergen is typically too difficult to construct and store in practice.

More recently, Heung-Yeung Shum and Li-Wei He in "Rendering with concentric mosaics," *Computer Graphics Proceedings, Annual Conference Series*, pp. 299-306, Proc. SIGGRAPH'99, August 1999, describe an image rendering process based on concentric mosaics. This image rendering process allows an observer to move freely within a circular region and allows images from the observer's viewpoint to be rendered in a more computationally efficient manner than many prior approaches. However, due to the manner in which images are rendered in the described technique, the quality of rendered images can sometimes suffer. Thus, it would be beneficial to provide a way to improve the quality of such rendered images.

Another aspect of image rendering that has been approached is the rendering of stereo images. In S. Peleg and M. Ben-Ezra, "Stereo panorama with a single camera," *Proc. Computer Vision and Pattern Recognition Conference*, 1999, stereo images are generated from a single rotating camera (off-centered). However, in the Peleg and Ben-Ezra system, the user is constrained to a fixed viewpoint—the scene cannot be wandered through by the observer. Thus, it would be beneficial to provide a way to allow stereo rendering of images while wandering through a scene.

The improved image rendering based on concentric mosaics described below addresses these and other disadvantages.

SUMMARY

Improved image rendering based on concentric mosaics is described herein. An observer is able to wander through a real or synthesized scene and have new view images of the scene rendered as the observer moves.

According to one aspect, a viewpoint and viewing direction are identified for an observer. Multiple viewing rays are then extended in the viewing direction from the image to be rendered at the view point. For viewing rays that coincide with captured images, the captured images are used for the rendered view. However, for viewing rays that do not coincide with captured images, an image is generated based on the captured images. The image is generated by interpolating between at least two captured images based on a constant distance to objects in the scene.

According to another aspect, stereo images for the observer are rendered. Left and right eye images are generated that correspond to a pair of eyes of the observer. The left and right eye images are generated based on the viewpoint and viewing direction, and are rendered substantially concurrently. Both images may be rendered on the same display, or alternatively on different displays (e.g., different screens of liquid crystal glasses).

DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs).

General System

Figure 1:
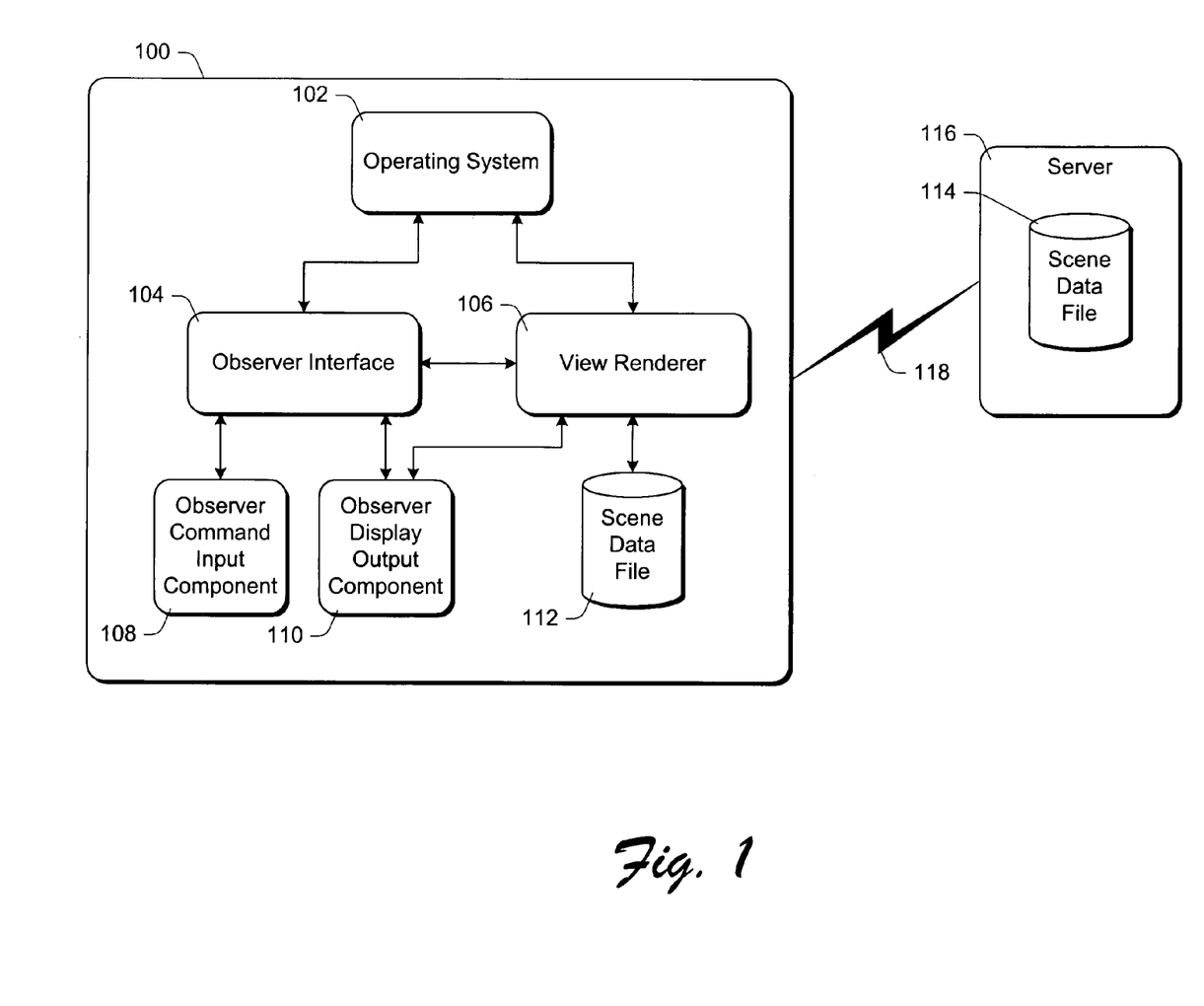
FIG. 1 illustrates an exemplary system for rendering views of a 3D scene based on concentric mosaics in accordance with certain embodiments of the invention.

FIG. 1 illustrates an exemplary system for rendering views of a 3D scene based on concentric mosaics in accordance with certain embodiments of the invention. The system 100 can be implemented in software, hardware, firmware, or a combination thereof. A computing system 100 is illustrated including an operating system 102, an observer interface 104, a view renderer 106, an observer command input component 108, an observer display output component 110, and a scene data file 112.

Operating system 102 performs various system level operations to control the lower level functions of the computing system and interaction of the various components 104-112 of system 100. View renderer 106 generates the image seen by the observer as he or she wanders through the scene represented in scene data file 112 and outputs the image using display output component 110. View renderer 106 uses various parameters to describe the observer's location and direction of view and uses the parameters, in conjunction with scene data file 112, to generate the image to output to the user. The geometric equations and relationships used to generate these parameters and apply them to scene data file 112 is discussed in more detail below.

The user can move around within the 3D scene by inputting appropriate commands to observer interface 104 through command input component 108. These commands may correspond to input keystrokes on a keyboard, appropriate movements of a pointing device (such as a joystick, mouse or trackball, virtual reality glove, or other controller), voice based motion commands, etc. These commands are translated by observer interface 104 to a location within the 3D scene and a direction of view of the observer that is presented for viewing by display output component 110. The display of output component 110 will change as if the user moved within the 3D scene. In addition to (or alternatively in place of) scene data file 112 being stored locally at system 100, a scene data file 114 may be accessed remotely (e.g., from a remote server 116). System 100 can be coupled to server 116 by any of a wide variety of conventional communication channels 118, such as a local area network (LAN), wide area network (WAN), the Internet, direct dial-up connection, etc. Scene data file 114 may be transferred to memory of system 100 prior to rendering, or alternatively may be transferred on an on-going basis (e.g., as needed to render views).

Figure 2:
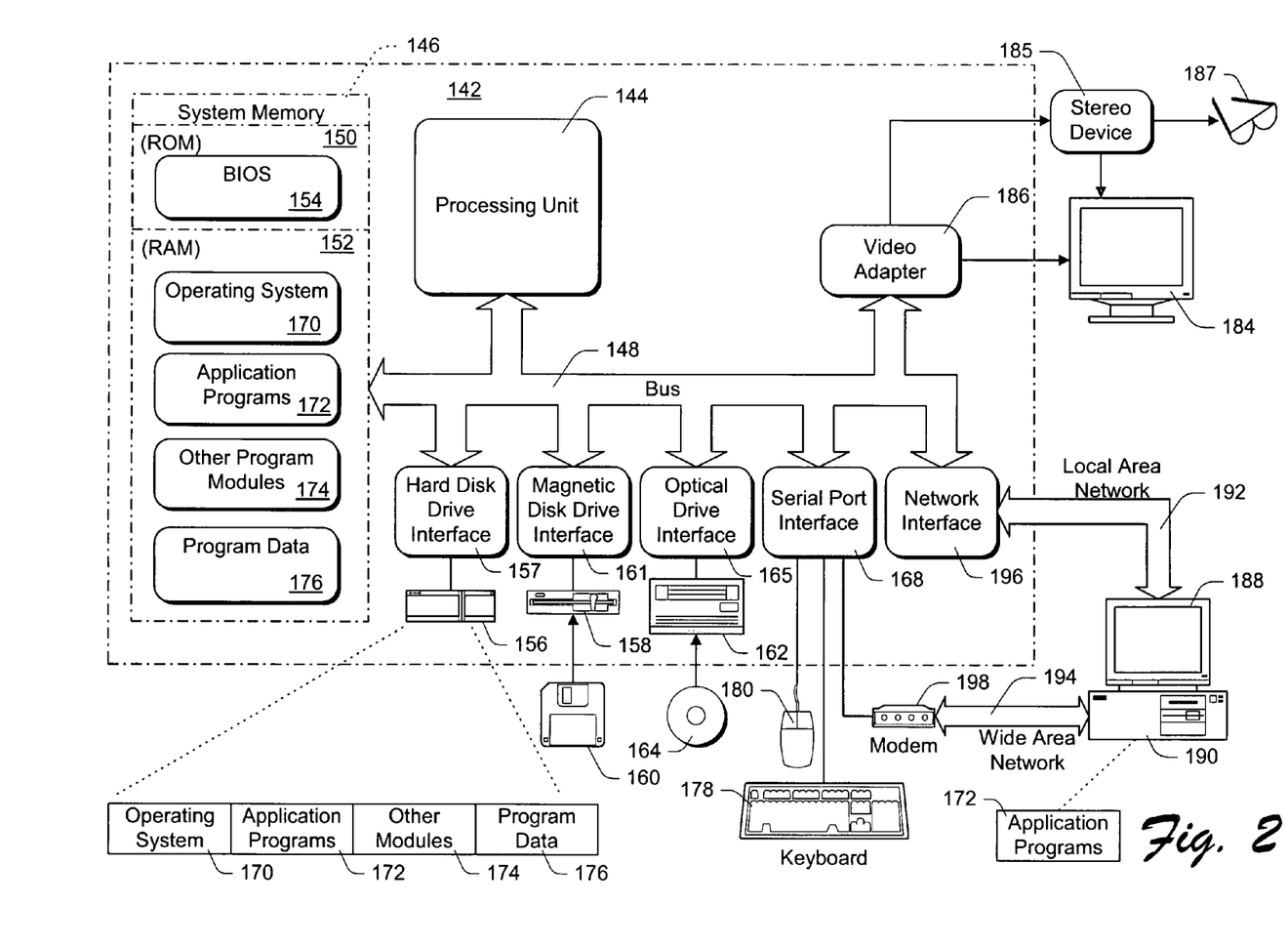
FIG. 2 shows a general example of a computer that can be used in accordance with certain embodiments of the invention.

FIG. 2 shows a general example of a computer 142 that can be used in accordance with certain embodiments of the invention. Computer 142 represents, for example, system 100 or server 116 of FIG. 1. Computer 142 includes one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures.

The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. Operating system 170 can be any of a variety of operating systems, such as any of the "Windows" family of operating systems available from Microsoft Corporation of Redmond, Wash. A user may enter commands and information into computer 142 through input devices such as keyboard 178 and pointing device 180 (such as a mouse). Other input devices (not shown) may include a microphone, joystick, game pad, satellite dish, scanner, motion tracking devices, virtual reality gloves, controllers, or the like. These and other input devices are connected to the processing unit 144 through an interface 168 (e.g., a serial port, parallel port, game port, or a universal serial bus (USB)) that is coupled to the system bus. A monitor 184 or other type of display device (such as a head mounted display, a 3D video projection, or the like) is also connected to the system bus 148 via an interface, such as a video adapter 186. In addition to the monitor, personal computers typically include other peripheral output devices (not shown) such as speakers and printers.

A stereo display device 185 and shutter crystal glasses 187 can also be included as an output device for the computer 142. Shutter crystal glasses 187 operate in conjunction with video adapter 186 to present stereo image pairs to left and right eyes of a user. Any of a wide variety of commercially available crystal glasses can be used, such as CrystalEyes available from StereoGraphics Corporation of San Rafael, Calif.. Alternatively, stereo image pairs can be output by stereo display device 185 and/or video adapter 186 to other display devices as well, such as monitor 184, a head-mounted display (not shown), etc.

Computer 142 can optionally operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the acts described below in conjunction with a microprocessor or other data processor. The invention also includes the computer itself when programmed according to the methods and techniques described herein. Furthermore, certain sub-components of the computer may be programmed to perform the functions and acts described herein. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Returning to FIG. 1, scene data file 112 and/or 114 are based on a set of mosaics. A mosaic is a collection of images of a surrounding 3D scene captured with camera motion constrained within a single plane. Multiple mosaics can be captured with the camera motion constrained to movement about a point of rotation within the same plane. A set of such multiple mosaics are referred to as concentric mosaics.

Figure 3:
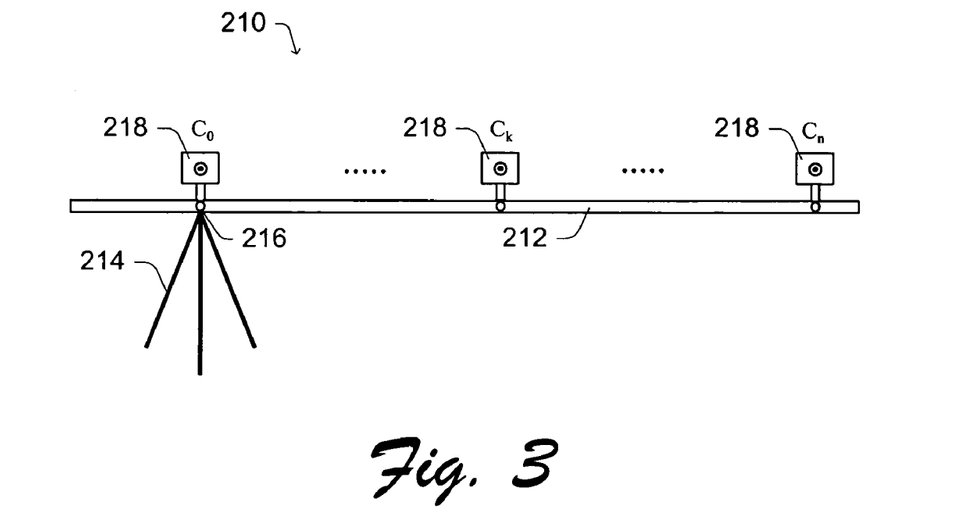
FIG. 3 illustrates an exemplary setup for capturing concentric mosaics.

FIG. 3 illustrates an exemplary setup for capturing concentric mosaics. A capture system 210 includes a beam 212 rotatably coupled to a support 214, allowing beam 212 to be rotated substantially 360 degrees. The location of this coupling defines a center of rotation 216. Multiple cameras 218 are placed along beam 212. As beam 212 is rotated a, images are being captured by cameras 218 along the tangent direction of the circle of rotation. The images captured by each camera 218 can be slit images (typically one pixel wide), or alternatively "whole area" images (i.e., a wider angle of capture than the typically single-pixel wide slit images, such as a 90 degree or 180 degree field of capture). The cameras 218 can be of any type appropriate for capturing images of the scene, such as video cameras (e.g., digital or non-digital), still cameras (e.g., film or digital), Charge Coupled Device (CCD) elements, etc.

Figure 4:
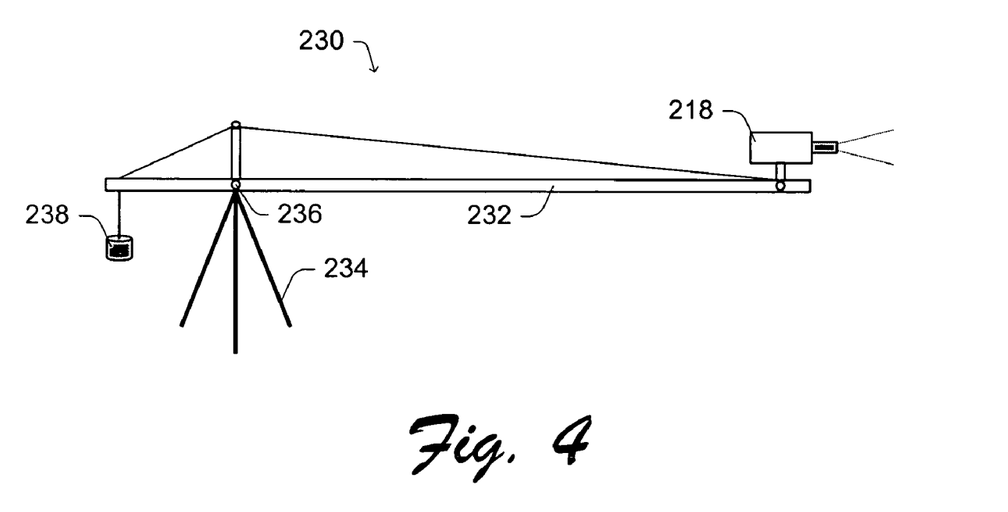
FIG. 4 illustrates another exemplary setup for capturing concentric mosaics.

FIG. 4 illustrates another exemplary setup for capturing concentric mosaics. A capture system 230 includes a beam 232 rotatably coupled to a support 234, allowing beam 232 to be rotated substantially 360 degrees about a center of rotation 236. A camera 218 is placed on beam 232 and a counterweight 238 is optionally placed at the end of the beam opposite camera 218. As beam 232 is rotated, images are captured by camera 218 along the radial direction of the circle of rotation.

The cameras 218 in FIGS. 3 and 4 define a circular region as they rotate about the center of rotation. This circular region is referred to herein as a "capture circle".

Alternatively, "capture" images can be generated synthetically, such as by using any of a wide variety of conventional graphics programs capable of producing a 3D scene. These programs can be employed to generate images of the desired dimensions, which depict a portion of a surrounding synthetic 3D scene from a perspective that is radial (or alternatively tangential) to a circle on a circle plane disposed within a synthetic 3D scene. Accordingly, it is to be understood that the "captured images" referred to herein could refer to either real images or synthetic images.

Image Rendering Using Linear Interpolation

Since concentric mosaics have captured many of the rays in the capture plane within the circular region defined by the movement of the capture camera(s), viewing rays from within the circle can be rendered. This allows the observer to move continuously within or nearby the circular region to observe motion parallax and lighting changes. However, only a subset of all the rays in the plane need be stored, so, depending on the observer's viewing position and viewing direction, some rays may need to be approximated. In accordance with certain embodiments of the invention, linear interpolation with constant depth is used to approximate such rays.

Figure 5:
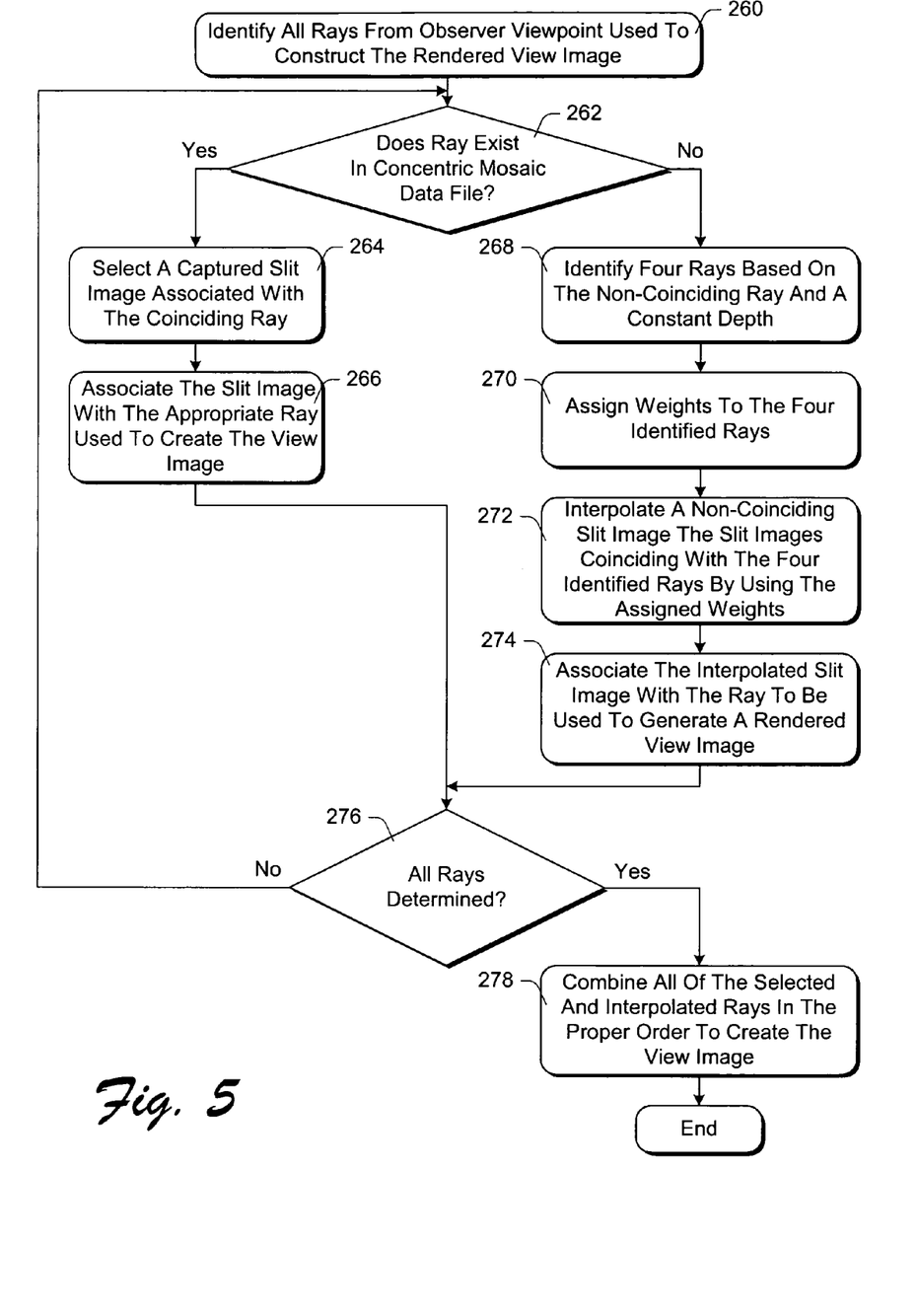
FIG. 5 is a flowchart illustrating an exemplary process for rendering images in accordance with certain embodiments of the invention.

FIG. 5 is a flowchart illustrating an exemplary process for rendering images in accordance with certain embodiments of the invention. The process of FIG. 5 is implemented by, for example, a system 100 of FIG. 1, and may be performed in software. FIG. 5 is discussed with reference to concentric mosaics rendered based on portions that are slit images (e.g., one pixel wide) tangential to the direction of rotation of the cameras. The rendering can be based on, for example, slit images captured tangential to the direction of rotation of the camera(s) or whole images captured radial to the direction of rotation of the camera(s). If the images are captured radial to the direction of rotation of the camera(s), then a concentric mosaic is formed by combining the same vertical line (e.g., the $20^{th}$ vertical scan line) taken at different rotation angles. The concentric mosaic so formed is the same as a concentric mosaic formed by capturing slit images tangential to the direction of rotation.

A view image from an observer's viewpoint inside the 2D circular region of the capture circle can be rendered by first identifying all the rays emanating from the viewpoint that represent the locations of the slit images used to construct the rendered view (act 260). Although these rays emanate from the same viewpoint, they emanate in different viewing directions (encompassing a latitudinal field of view of the observer). These viewing directions are together represented by the direction of viewing of the observer (which is, for example, one of the viewing directions (e.g., the centermost viewing direction)). Next, one of the identified rays is selected and a check is made as to whether the selected ray coincides with a previously captured slit image (act 262). This can be accomplished by checking both the radial location and the rotation angle of the captured slit images.

If there is such a coinciding ray, then the associated previously captured slit image associated with the coinciding ray is selected as one of the slit images used to form a part of the rendered view image (act 264). The selected ray is also associated with the coinciding ray emanating from the viewpoint of the rendered view image (act 266). This can be accomplished by associating a unique identifier for the slit image (e.g., its radial location and angle of rotation) with the appropriate ray emanating from the rendered view's viewpoint.

Figure 6:
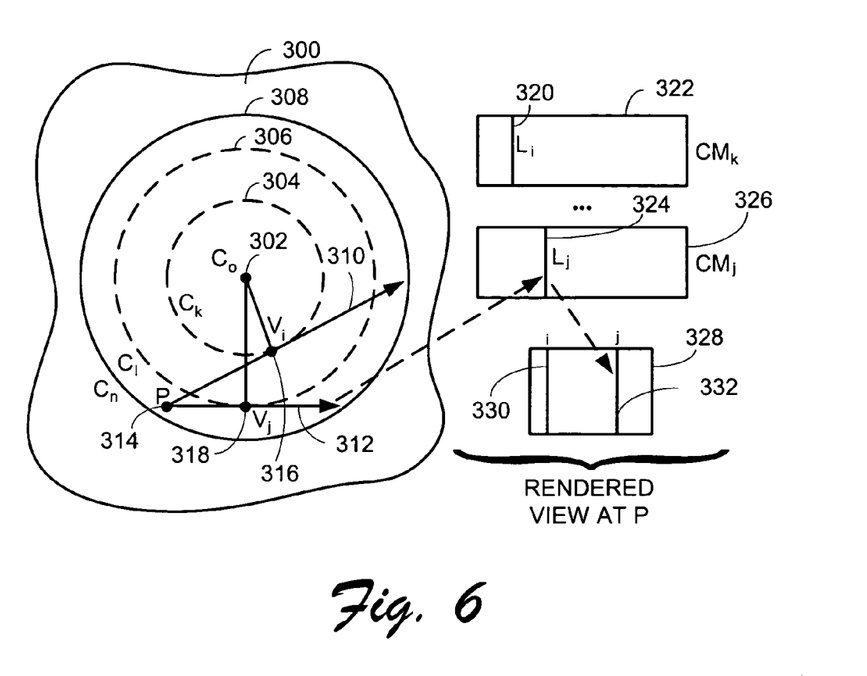
FIG. 6 is a diagram illustrating an exemplary set of concentric circles and the concentric mosaics associated with two of them, as well as rays associated with a viewpoint that coincide with rays associated with the concentric mosaics in accordance with certain embodiments of the invention.

This process is illustrated schematically in FIG. 6. The left side of FIG. 6 shows the circle plane 300 with several of the concentric circles ($C_o$, $C_k$, $C_l$, and $C_n$) 302, 304, 306, and 308. In addition, rays 310 and 312 are shown emanating from viewpoint (P) 314 and respectively traversing the circle plane 300 toward two of the slit images needed to form the novel view. To render a novel view from viewpoint 314, the captured slit images that coincide with rays 310 and 312 are found. As all the captured slit images where taken in a direction tangent to one of the concentric circles, a coinciding captured slit image can be found by determining where a ray emanating from viewpoint 314 becomes tangent with one of the concentric circles. In the depicted case, ray 310 is tangent to circle 304 at point ($v_i$) 316 and ray 312 becomes tangent to circle 306 at point ($v_j$) 318. Thus, the rays that are associated with these points 316 and 318, and have the same direction as rays 310 and 312, identify the slit images needed to form part of the view image.

There may be, however, practical limits to the number of concentric mosaics that can be captured and/or stored. A limitation on the number of concentric mosaics can have an impact on the rendered view images because some of the ray images needed to form a rendered view image may not exactly line up with one of the captured slit images. In other words, it is possible that an image ray needed to form a part of the rendered view be approximated based on two or more captured rays.

Figure 7:
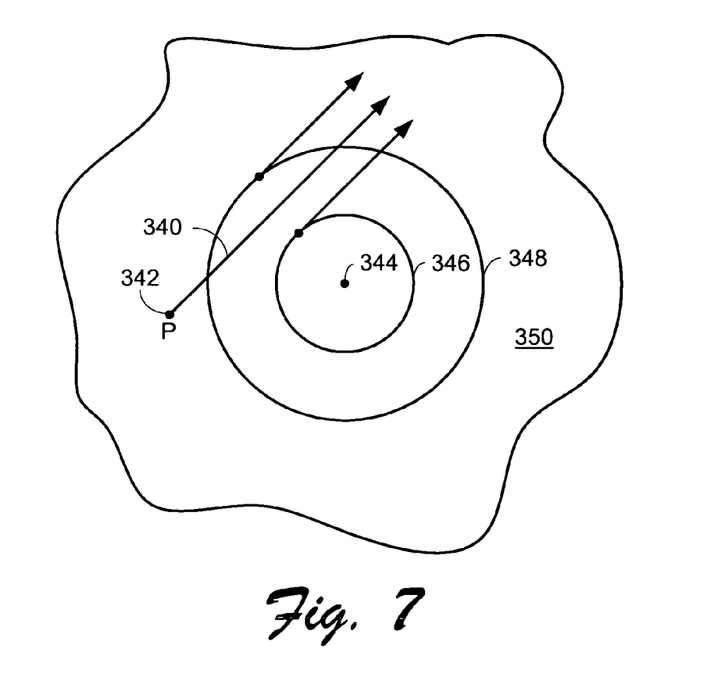
FIG. 7 is a diagram illustrating another exemplary set of concentric circles as well as a ray associated with a viewpoint in accordance with certain embodiments of the invention.

Referring to FIG. 7, the foregoing situation can be illustrated as a ray 340 emanating from a viewpoint 342 associated with a view image, which never becomes tangent to any of the concentric circles 344, 346, and 348 on the circle plane 350. Instead the ray 340 passes between two of the circles 346 and 348. Therefore, no ray associated with a captured slit image will coincide with the ray 340 (hereinafter referred to as a "non-coinciding ray").

One way of dealing with this situation is via a linear interpolation process. Linear interpolation involves blending multiple captured slit images to form the slit image required for the rendered view image being created. The blending process assigns a weight to each pixel display value in the multiple captured slit images and adds these values together proportionally. In one implementation, described in more detail below (with reference to FIG. 8), four slit images (based on four rays) are blended based on weighted values derived from using a constant or fixed depth. Alternatively, fewer or greater numbers of images may be used in the interpolation process. Returning to FIG. 5, this blending is accomplished by initially identifying four rays based on the non-coinciding ray and a constant depth, with each of the four rays coinciding with a captured slit image (act 268).

A weight is then assigned to each of the four rays (act 270). The captured slit images coinciding with these four rays, and the assigned weights, are then used to interpolate a non-coinciding slit image (act 272). In one implementation, a computed ratio specifies the weight each of the rays (and thus the proportion of each of the captured slit images coinciding with the rays to be used in generating the pixel values for the interpolated slit image) is to be given in the blending process to generate the interpolated slit image needed to construct the rendered view image.

Once the interpolated slit image is generated, it is associated with the appropriate ray emanating from the viewpoint of the rendered view image (i.e., the non-coinciding ray) (act 274). The above sequence of operations will continue until slit images for all the rays to be used for the rendered view image are generated (act 276).

The rendered view image is then generated by combining all the identified and interpolated rays in the proper order to create the rendered view (act 278). Referring to the right hand side of FIG. 6, the combining process is illustrated for the case where rays associated with captured slit images coincide with rays identifying slit images needed to construct the rendered view image. The slit image ($L_i$) 320 of the concentric mosaic ($CM_k$) 322 is the slit image identified by the captured ray associated with point ($v_i$) 316. Similarly, the slit image ($L_j$) 324 of the concentric mosaic ($CM_l$) 326 is the slit image identified by the captured ray associated with point ($v_j$) 318.

Therefore, these slit images 320 and 324 can be used to construct part of the rendered view image 328. Specifically, slit image ($L_i$) 320 is placed in the appropriate location, as slit image (i) 330, in the rendered view image 328. Similarly, slit image ($L_j$) 324 is placed in the appropriate location, as slit image (j) 332, in the rendered view image 328. In the case where a linear interpolation process is used to produce a slit image for the rendered view from captured slit images, the slit image placement is performed after the interpolated slit image is constructed.

Bilinear interpolation with constant depth (also referred to as fixed depth) is one linear interpolation process used for interpolating in accordance with certain embodiments of the invention. While capturing concentric mosaics, the distance from the rotation center to a camera position r can be determined (e.g., the distance between center of rotation 216 and a camera 218 of FIG. 3) can be recorded. Additionally, the distance from the rotation center to the nearest object of interest ($R_{min}$), as well as the distance from the rotation center to the farthest object of interest ($R_{max}$) can also be recorded. During interpolation, it is assumed that all the objects have a constant depth $R=(R_{min}+R_{max})/2$ (i.e., they are all located at a cylinder with radius R). Alternatively, the constant depth can be determined in other manners, such as a median depth based on all (or alternatively less than all) of the objects.

The nearest and farthest objects of interest can be manually or automatically selected. These objects can be absolutes (e.g., the physically closest or physically farthest objects), representative of a group of objects that are at approximately the same distance, approximations, etc.

Alternatively, rather than using the same depth R for all objects, the depth R can vary through different portions of the scene. These different portions can be defined, for example, by radial locations. By way of example, the first 90 degrees may have a first depth, the next 180 degrees may have a second depth, and the next 90 degrees may have a third depth.

Figure 8:
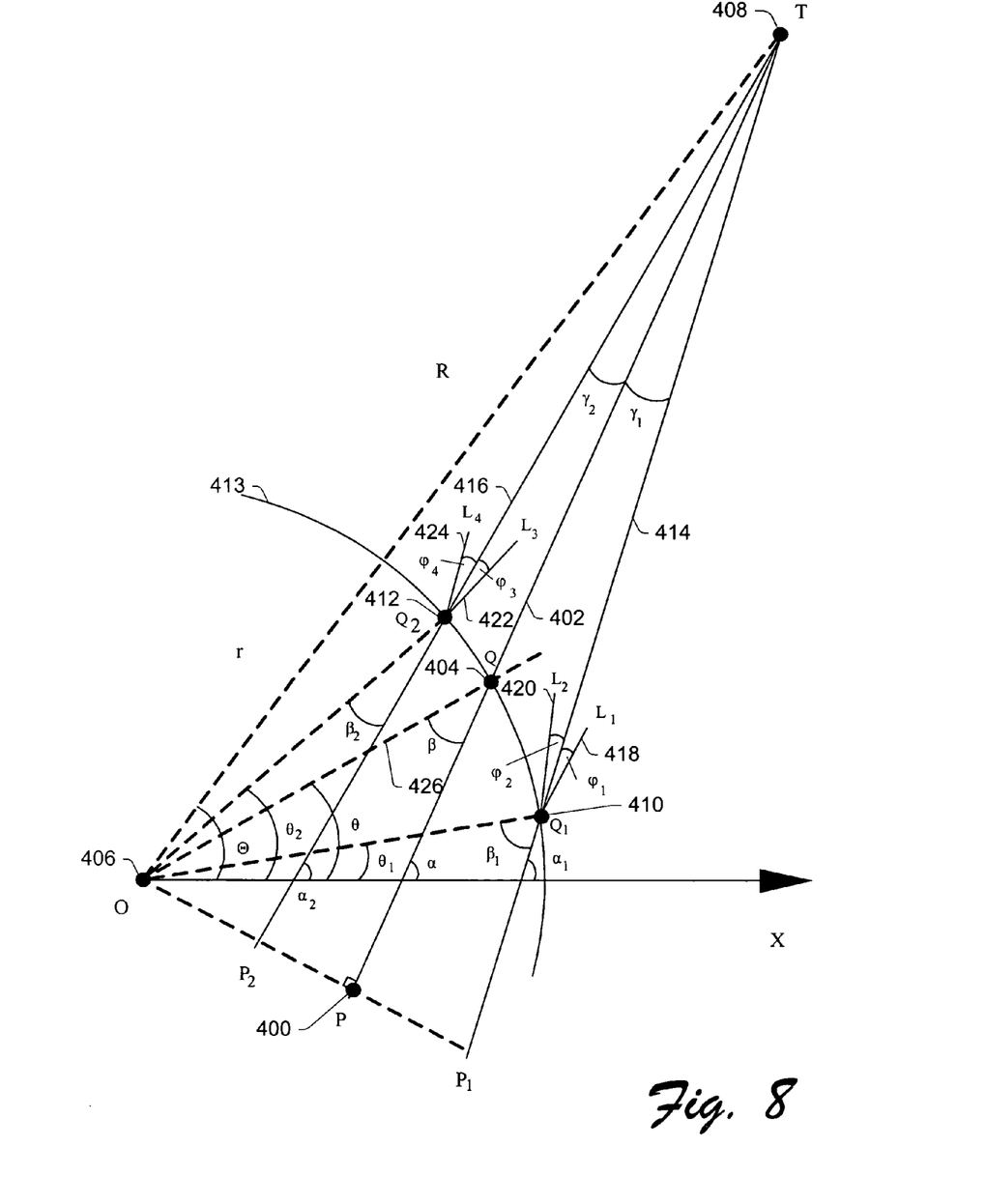
FIG. 8 is a diagram illustrating an exemplary viewing ray and an interpolation process using constant depth in accordance with certain embodiments of the invention.

The bilinear interpolation process is discussed in additional detail with reference to FIG. 8. Given a viewpoint (P) 400 and a viewing direction, a line 402 (PQ) can be generated. The point 404 (Q) is the intersection point of the outermost capture circle and a viewing ray extending from viewpoint (P) 400 in the view direction. Alternatively, a different circle other than the outermost capture circle may be used for point 404 (Q). Let line 402 (PQ) intersect with the cylinder having an origin (0) 406 and a radius R at point 408 (T), where |OT|=R.

Next, two sample points 410 ($Q_1$) and 412 ($Q_2$) are determined, each corresponding to a camera location where an image was captured. These sample points 410 ($Q_1$) and 412 ($Q_2$) are closest to the point of intersection (Q) 404 along the capture circle 413 at a distance r from the origin (O). From each of the two sampled viewpoints 410 and 412, a line to point 408 (T) is drawn, resulting in lines 414 ($P_1Q_1$) and 416 ($P_2Q_2$), respectively. For both lines 414 and 416, the two sample rays (each coinciding with a previously captured slit image) that are closest to each of them is determined, resulting in four sample rays ($L_1, L_2, L_3$ and $L_4$) 418, 420, 422, and 424. Each of these four sample rays 418, 420, 422, and 424 is given a weight, and the weighted values are used to calculate values for the non-coinciding ray 402 (PQ).

In one implementation, the weights assigned to each of the four sample rays 418, 420, 422, and 424 are calculated as follows. The weight of sample ray 418 is $w_1$, is calculated as follows:

$$w_1 = \frac{\gamma_2}{\gamma_1 + \gamma_2} \cdot \frac{\varphi_2}{\varphi_1 + \varphi_2}$$

where $\gamma_1$ is the angle between lines 414 and 402, $\gamma_2$ is the angle between lines 402 and 416, $\phi_1$ is the angle between ray 418 and line 414, and $\phi_2$ is the angle between line 414 and ray 420.

The weight of sample ray 420 is $w_2$, is calculated as follows:

$$w_2 = \frac{\gamma_2}{\gamma_1 + \gamma_2} \cdot \frac{\varphi_1}{\varphi_1 + \varphi_2}$$

where $\gamma_1$ is the angle between lines 414 and 402, $\gamma_2$ is the angle between lines 402 and 416, $\phi_1$ is the angle between ray 418 and line 414, and $\phi_2$ is the angle between line 414 and ray 420.

The weight of sample ray 422 is $w_3$, is calculated as follows:

$$w_3 = \frac{\gamma_1}{\gamma_1 + \gamma_2} \cdot \frac{\varphi_4}{\varphi_3 + \varphi_4}$$

where $\phi_3$ is the angle between ray 422 and line 416, and $\phi_4$ is the angle between line 416 and ray 424.

The weight of sample ray 424 is $w_4$, is calculated as follows:

$$w_4 = \frac{\gamma_1}{\gamma_1 + \gamma_2} \cdot \frac{\varphi_3}{\varphi_3 + \varphi_4}$$

where $\phi_3$ is the angle between ray 422 and line 416, and $\phi_4$ is the angle between line 416 and ray 424.

The values for $\gamma_1$ and $\gamma_2$ are calculated as follows. Initially, a value $\Theta$ is calculated, $$\Theta = \alpha - \arcsin\left(\frac{r \sin \beta}{R}\right)$$

where $\alpha$ is the angle between the x axis and line 402, r is the distance between the rotation center and the capture circle 413, R is the constant depth calculated above, and $\beta$ is the angle between line 402 and a line 426 from the origin 406 to point 404. Given $\Theta$, the values of vectors T, $Q_1$, and $Q_2$ can be calculated as follows, $T = (R \cos \Theta, R \sin \Theta)$ $Q_1 = (r \cos \theta_1, r \sin \theta_1)$ $Q_2 = (r \cos \theta_2, r \sin \theta_2)$ Once the values of the vectors T, $Q_1$, and $Q_2$ are calculated, two values $\alpha_1$ and $\alpha_2$ can be calculated as follows, $\alpha_1 = \arctan(T.y - Q_1.y, T.x - Q_1.x)$ $\alpha_2 = \arctan(T.y - Q_2.y, T.x - Q_2.x)$ Given the two values $\alpha_1$ and $\alpha_2$, the values for $\gamma_1$ and $\gamma_2$ can be calculated as follows, $\gamma_1 = \alpha_1 - \alpha$ $\gamma_2 = \alpha - \alpha_2$ Stereo Image Rendering In certain embodiments of the invention, images can be rendered in stereo. Stereo rendering often better simulates the viewing of the surrounding scene by an observer as it can simulate the view from a pair of eyes. Stereo rendering is further improved when the rendering is performed with a stereo viewing device, such as the shutter crystal glasses described above.

Figure 9:
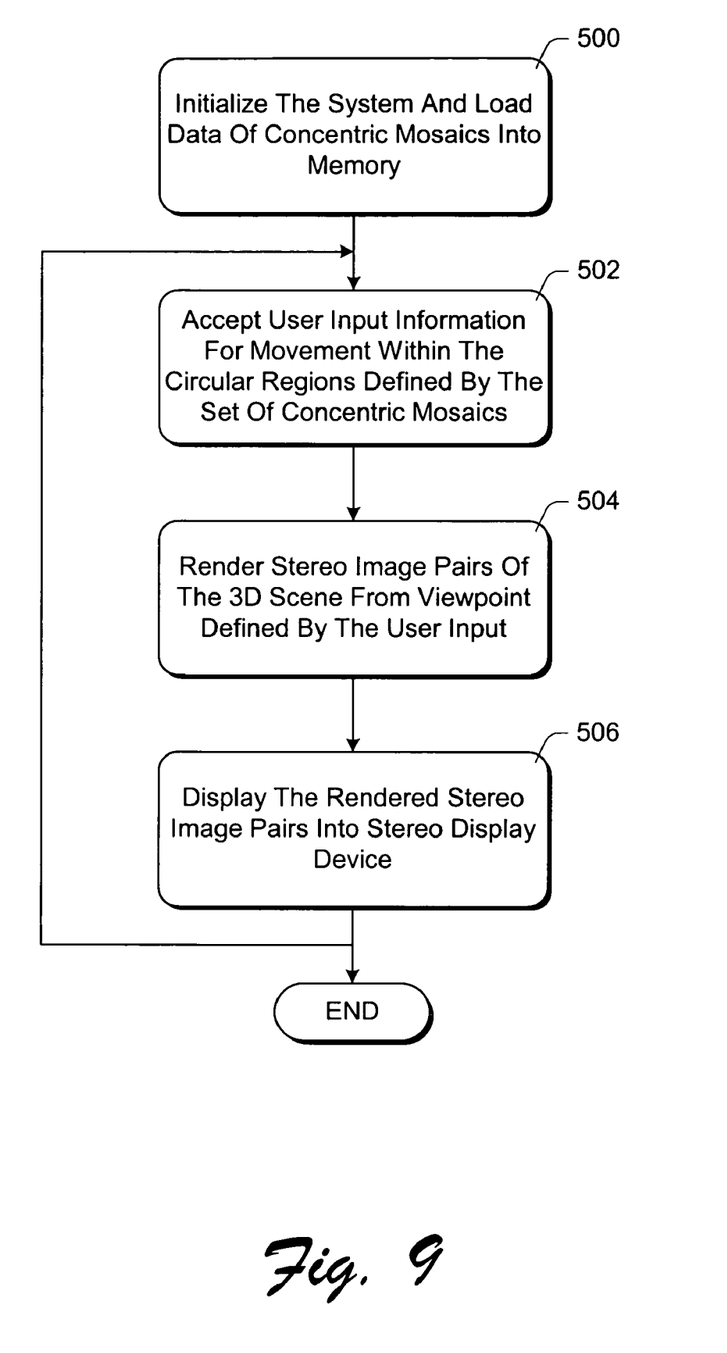
FIG. 9 is a flowchart illustrating an exemplary process for rendering stereo images as an observer wanders about a scene in accordance with certain embodiments of the invention.

FIG. 9 is a flowchart illustrating an exemplary process for rendering stereo images as an observer wanders about a scene in accordance with certain embodiments of the invention. The process of FIG. 9 is implemented by, for example, a system 100 of FIG. 1, and may be performed in software.

Initially, the system is initialized and the data of the concentric mosaics (e.g., scene data file 112 or 114) is loaded into memory (act 500). This initialization can include a default viewing location and direction of viewing for the observer, so an initial rendered view image is generated. Alternatively, some or all of the data is not loaded into memory; rather, the data is loaded into memory later (e.g., when needed to generate a rendered view image).

Once initialized, the system accepts user input information for movement within the circular regions defined by the set of concentric mosaics (act 502). The system receives the input information via various user interfaces, determines whether the input is legal for rendering stereo images (e.g., the movement does not exceed the capture circle or does not exceed the capture circle by more than a predetermined amount), and generates the necessary parameters needed to describe the observer's viewpoint and viewing direction(s).

In response to each user movement input, stereo image pairs of the 3D scene (e.g., a left eye image and a right eye image) are rendered from the new viewpoint defined by the user input (act 504). The stereo image pairs represent, for example, the surrounding scene an observer would see if standing within the 3D scene captured by the concentric mosaics. This rendered view is then displayed into a stereo display device (act 506) for viewing by the user.

Figure 10:
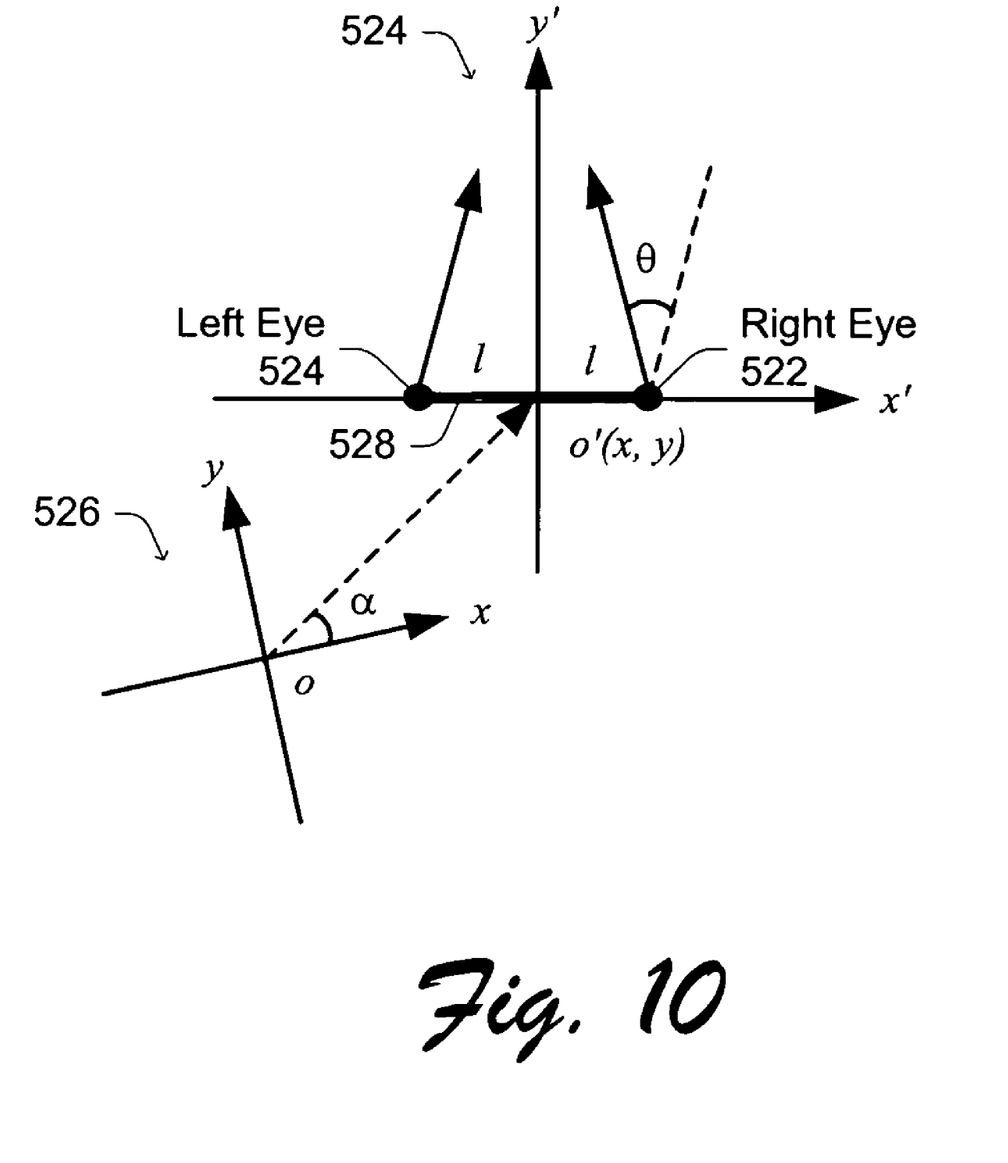
FIG. 10 is a diagram illustrating exemplary viewpoints for stereo rendering in accordance with certain embodiments of the invention.

As shown in FIG. 10, a local coordinate system is used to describe the motion of an eye pair (left eye 520 and right eye 522). The local coordinate system 524 maps to a global coordinate system 526. The distance between the two eyes 520 and 522 is denoted by 2l. The viewing positions of the left and right eyes 520 and 522 equal the position of the center of the connection line 528 between the eyes 520 and 522 minus and plus the value l, respectively.

The eye pair 520, 522 possesses a total of 5 freedoms of motion (l, α, x, y, θ). The motion l is translation freedom that allows the user to adjust the distance 528 between the eyes 520 and 522. The motion α is rotation freedom that allows the user to adjust the angle between the eyes 520 and 522 (e.g., to obtain intaglio or rilievi effects). The motions x and y are translation freedoms that allow the user to move freely within a 2D circular region. The motion θ is rotation freedom that allows the user to turn his or her head in any 2D direction.

Once the viewpoint and eye parameters are generated (e.g., by observer interface 104 of FIG. 1), they are used (e.g., by view renderer 106 of FIG. 1) to render a corresponding stereo image pair.

Figure 11:
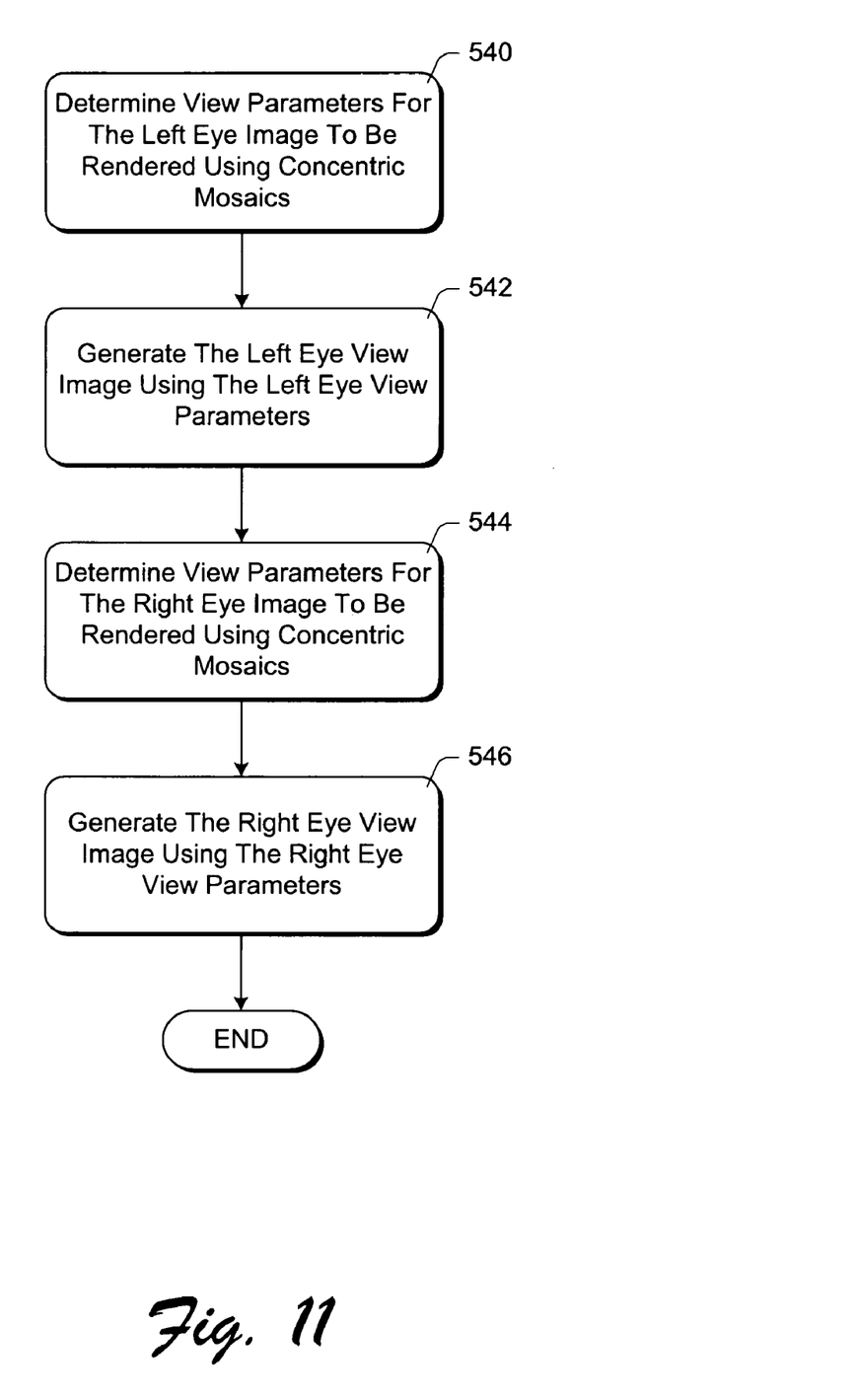
FIG. 11 is a flowchart illustrating an exemplary process for generating stereo images in accordance with certain embodiments of the invention.

FIG. 11 is a flowchart illustrating an exemplary process for generating stereo images in accordance with certain embodiments of the invention. The process of FIG. 11 is implemented by, for example, view renderer 106 of FIG. 1, and may be performed in software.

Initially, a set of necessary parameters needed to define the viewpoint and viewing direction(s) for the left eye image are determined (act 540). Using the left eye view parameters, a first rendered view image is generated (act 542). Next, a set of necessary parameters needed to define the viewpoint and viewing direction(s) for the right eye image are determined (act 544). Using the right eye view parameters, a second rendered view image is generated (act 546). The two rendered view images are now able to be presented to a display component (e.g., display output component 110 of FIG. 1).

In one implementation, the viewpoint of the eye pair is calculated from a center point between the two eyes. Alternatively, the view point may be calculated based on one or the other of the two eyes. The viewing direction(s) for both of the eyes is the same (or may be changed by adjusting the angle between the eyes).

During rendering of each of the stereo images (in acts 542 and 546), non-coinciding rays can be encountered as discussed above with reference to FIG. 5. Values for such rays can be determined using the linear interpolation with constant depth as discussed above, or alternatively using other interpolation techniques.

CONCLUSION

Thus, improved image rendering based on concentric mosaics has been described. In certain embodiments, view images are rendered by calculating the values for portions of images corresponding to viewing rays from an observer's view point in a viewing direction(s). In the event that a viewing ray does not coincide with a captured image, linear interpolation with constant depth is advantageously used to calculate a value for the portion of the image corresponding to the viewing ray. Additionally, in certain embodiments stereo rendering of images is performed, allowing a more realistic "two-eye" view of the surrounding scene.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. One or more computer-readable media having stored thereon a computer program that, when executed by one or more processors of the computer, causes the one or more processors to perform acts including:
   identifying a plurality of viewing rays to be used to construct, based on previously captured concentric mosaics, a view image of a scene represented by the concentric mosaics;
   checking whether each of the plurality of viewing rays coincides with at least a portion of a captured image;
   for each viewing ray that coincides with at least a portion of a captured image, selecting the portion of the captured image;
   for each viewing ray that does not coincide with at least a portion of a captured image, generating an interpolated portion by interpolating between at least two portions of one or more captured images based on a constant distance to objects in the scene; and
   combining the selected and interpolated portions to generate the view image.

2. One or more computer-readable media as recited in claim 1, wherein each portion comprises a slit image.

3. One or more computer-readable media as recited in claim 1, wherein the constant distance is different for each of a plurality of different portions of the scene.

4. One or more computer-readable media as recited in claim 1, wherein the combining comprises placing the selected and interpolated portions in a side-by-side arrangement to generate the view image.

5. One or more computer-readable media as recited in claim 1, wherein the view image comprises a stereo image including a left eye view and a right eye view.

6. One or more computer-readable media as recited in claim 1, wherein the scene has been previously captured using one or more cameras.

7. One or more computer-readable media as recited in claim 1, wherein the scene is a computer-synthesized scene.

8. One or more computer-readable media having stored thereon a computer program that, when executed by one or more processors of the computer, causes the one or more processors to perform acts including:
   identifying a plurality of viewing rays to be used to construct a view image of a scene represented by a mosaic;
   checking whether each of the plurality of viewing rays coincides with at least a portion of a captured image;
   for each viewing ray that coincides with at least a portion of a captured image, selecting the portion of the captured image;
   for each viewing ray that does not coincide with at least a portion of a captured image, generating an interpolated portion by interpolating between at least two portions of one or more captured images based on a constant distance to objects in the scene, wherein the constant distance is calculated based on both a first distance between a center of capture rotation and a nearest object of the scene and a second distance between the center of capture rotation and a farthest object of the scene; and combining the selected and interpolated portions to generate the view image.

9. One or more computer-readable media as recited in claim 8, wherein the constant distance is calculated as the average of the first and second distances.

10. One or more computer-readable media having stored thereon a computer program that, when executed by one or more processors of the computer, causes the one or more processors to perform acts including:

identifying a plurality of viewing rays to be used to construct, based on a previously captured mosaic, a view image of a scene represented by the mosaic, wherein each of the plurality of viewing rays extends from a viewing point within a circular region defined by the mosaic;

checking whether each of the plurality of viewing rays coincides with at least a portion of a captured image;

for each viewing ray that coincides with at least a portion of a captured image, selecting the portion of the captured image;

for each viewing ray that does not coincide with at least a portion of a captured image, generating an interpolated portion by interpolating between at least two portions of one or more captured images based on a constant distance to objects in the scene; and combining the selected and interpolated portions to generate the view image.

11. One or more computer-readable media having stored thereon a computer program that, when executed by one or more processors of the computer, causes the one or more processors to perform acts including:

identifying a plurality of viewing rays to be used to construct a view image of a scene represented by a set of concentric circle mosaics based on a set of concentric circles;

checking whether each of the plurality of viewing rays coincides with at least a portion of a captured image;

for each viewing ray that coincides with at least a portion of a captured image, selecting the portion of the captured image;

for each viewing ray that does not coincide with at least a portion of a captured image, generating an interpolated portion by interpolating between at least two portions of one or more captured images based on a constant distance to objects in the scene; and combining the selected and interpolated portions to generate the view image.

12. One or more computer-readable media as recited in claim 11, wherein generating an interpolated portion for a viewing ray further comprises:

identifying an intersection point that is the intersection of the viewing ray in a viewing direction with an outermost concentric circle of the set of concentric circles;

identifying a view termination point that is on the viewing ray and that is the constant distance away from the origin of the set of concentric circles;

identifying first and second image capture points that are adjacent to the intersection point along the outermost concentric circle, and that are on either side of the intersection point;

identifying a first line extending between the first image capture point and the termination point;

identifying a second line extending between the second image capture point and the termination point;

identifying first and second sample rays that are adjacent to the first line and that are on either side of the first line;

identifying third and fourth sample rays that are adjacent to the second line and that are on either side of the second line;

determining a weight for each of the first, second, third, and fourth sample rays; and combining the weighted values of the first, second, third, and fourth sample rays to generate the interpolated portion for the viewing ray.

13. One or more computer-readable media as recited in claim 12, wherein $\gamma_1$ represents an angle between the viewing ray and the first line, wherein $\gamma_2$ represents an angle between the viewing ray and the second line, wherein $\phi_1$ represents an angle between the first sample ray and the first line, wherein $\phi_2$ represents an angle between the second sample ray and the second line, and wherein the weight ($w_1$) of the first sample ray is defined by, $$w_1 \frac{\gamma_2}{\gamma_1 + \gamma_2} \cdot \frac{\varphi_2}{\varphi_1 + \varphi_2}.$$

14. One or more computer-readable media as recited in claim 12, wherein $\gamma_1$ represents an angle between the viewing ray and the first line, wherein $\gamma_2$ represents an angle between the viewing ray and the second line, wherein $\phi_1$ represents an angle between the first sample ray and the first line, wherein $\phi_2$ represents an angle between the second sample ray and the second line, and wherein the weight ($w_2$) of the second sample ray is defined by, $$w_2 \frac{\gamma_1}{\gamma_1 + \gamma_2} \cdot \frac{\varphi_1}{\varphi_1 + \varphi_2}.$$

15. A method of generating values for a portion of an image of a scene represented by concentric mosaics to be rendered, the method comprising:

interpolating between at least a portion of each of two or more captured images based on a constant distance to objects in the scene.

16. A method as recited in claim 15, wherein the portion of the image comprises a slit image.

17. A method as recited in claim 15, wherein each of the two or more captured images comprises a slit image.

18. A method as recited in claim 15, wherein the constant distance is calculated based on both a first distance between a center of capture rotation and a nearest object of the scene and a second distance between the center of capture rotation and a farthest object of the scene.

19. A method as recited in claim 18, wherein the constant distance is calculated as the average of the first and second distances.

20. A method as recited in claim 15, wherein the constant distance is different for each of a plurality of different portions of the scene.

21. One or more computer-readable memories containing a computer program that is executable by a processor to perform the method recited in claim 15.

22. A method of generating values for a portion of an image of a scene represented by a mosaic to be rendered, the method comprising:

interpolating between at least a portion of each of two or more captured images based on a constant distance to objects in the scene, wherein the scene is represented by a set of concentric circle mosaics.

23. A method comprising:
generating, from concentric mosaics and based on a plurality of viewing rays, a plurality of image values for a view of a scene;
using, as a first set of image values for the view, at least a portion of a captured image; and
using, as a second set of image values for the view, interpolated values generated by interpolating between at least two portions of one or more captured images based on a constant distance to objects in the scene.

24. A method as recited in claim 23, wherein the view image comprises a stereo image including a left eye view and a right eye view.

25. A method as recited in claim 23, wherein the constant distance is different for each of a plurality of different portions of the scene.

26. A method as recited in claim 23, wherein the first set of image values and the second set of image values each comprise a slit image.

27. A method as recited in claim 23, wherein the portion of the captured images comprises a slit image.

28. One or more computer-readable memories containing a computer program that is executable by a processor to perform the method recited in claim 23.

29. A method comprising:
generating, based on a plurality of viewing rays, a plurality of image values for a view of a scene represented by a set of concentric circle mosaics based on a set of concentric circles;
using, as a first set of image values for the view, at least a portion of a captured image; and
using, as a second set of image values for the view, interpolated values generated by interpolating between at least two portions of one or more captured images based on a constant distance to objects in the scene.

30. A method as recited in claim 29, wherein the constant distance is calculated based on both a first distance between a center of the set of concentric circles and a nearest object of the scene and a second distance between the center of the set of concentric circles and a farthest object of the scene.

31. A method as recited in claim 30, wherein the constant distance is calculated as the average of the first and second distances.

32. A system comprising:
an observer interface to receive user input commands and identify a viewpoint and a direction of viewing based on the input commands; and
a view renderer, communicatively coupled to the observer interface, to receive the viewpoint and the direction of viewing, to generate values based on previously captured concentric mosaics for a portion of an image of a scene represented by the concentric mosaics, and to interpolate between at least two captured images based on a constant distance to objects in the scene.

33. A system as recited in claim 32, wherein the view renderer is further to identify a left viewpoint and a right viewpoint based on the received viewpoint, and to generate a first image of the scene based on the left viewpoint and a second image of the scene based on the right viewpoint.

34. A system as recited in claim 33, further comprising a stereo rendering device, coupled to the view renderer, to display the first and second images concurrently.

35. A system as recited in claim 32, further comprising an interface, coupled to the view renderer, via which the view renderer can receive at least a portion of a scene data file from a remote server.

36. A system comprising:
an observer interface to receive user input commands and identify a viewpoint and a direction of viewing based on the input commands; and
a view renderer, communicatively coupled to the observer interface, to receive the viewpoint and the direction of viewing, to generate values for a portion of an image of a scene represented by a set of concentric circle mosaics based on a set of concentric circles, and to interpolate between at least two captured images based on a constant distance to objects in the scene.

37. A system as recited in claim 36, wherein the constant distance is calculated based on both a first distance between a center of the set of concentric circles and a nearest object of the scene and a second distance between the center of the set of concentric circles and a farthest object of the scene.

38. A system as recited in claim 37, wherein the constant distance is calculated as the average of the first and second distances.

39. One or more computer-readable media having stored thereon a computer program that, when executed by one or more processors of the computer, causes the one or more processors to perform acts including:
accessing concentric mosaics of a scene that are a sequence of images captured by moving a camera in a path around a point, the sequence of images including a plurality of image data, each having a ray direction associated therewith;
identifying a left viewpoint and a right viewpoint within a circle defined by the movement of the camera around the point;
obtaining left image data from the sequence of images that has a ray direction substantially aligned with the ray direction from the left viewpoint;
obtaining right image data from the sequence of images that has a ray direction substantially aligned with the ray direction from the right viewpoint;
creating a portion of a left image as seen from the left viewpoint by using the obtained left image data; and
creating a portion of a right image as seen from the right viewpoint by using the obtained right image data.

40. One or more computer-readable media as recited in claim 39, wherein the left image data and the right image data are each a discrete image line formed by multiple pixels having the same ray direction.

41. One or more computer-readable media as recited in claim 39, wherein the ray direction from the left viewpoint is substantially parallel to the ray direction from the right viewpoint.

42. One or more computer-readable media as recited in claim 39, wherein the ray direction from the left viewpoint is a first ray direction and the method includes determining multiple ray directions, one for each pixel width in the created left image.

43. One or more computer-readable media as recited in claim 39, wherein the ray direction from the right viewpoint is a first ray direction and the method includes determining multiple ray directions, one for each pixel width in the created right image.

44. A system comprising:
an observer interface to receive user input commands and identify a viewpoint and viewing direction based on the input commands; and a view renderer, communicatively coupled to the observer interface, to receive the viewpoint and direction of viewing, and to generate, based on the viewpoint and the direction of viewing, a pair of rendered view images of a scene, wherein the scene is represented by concentric mosaics.

45. A system as recited in claim 44, wherein the view renderer is further to identify a left viewpoint and a right viewpoint based on the received viewpoint, and to generate a first of the pair of images based on the left viewpoint and a second of the pair of images based on the right viewpoint.

46. A system as recited in claim 45, further comprising a stereo rendering device, coupled to the view renderer, to display the first and second images concurrently.

47. A system as recited in claim 44, wherein the view renderer is further to generate values for a portion of one of the pair of rendered view images by interpolating between at least two captured images based on a constant distance to objects in the scene.

48. A system as recited in claim 44, further comprising an interface, coupled to the view renderer, via which the view renderer can receive at least a portion of a scene data file from a remote server.

49. A system comprising:
an observer interface to receive user input commands and identify a viewpoint and viewing direction based on the input commands; and
a view renderer, communicatively coupled to the observer interface, to receive the viewpoint and direction of viewing, and to/generate, based on the viewpoint and the direction of viewing, a pair of rendered view images of the scene, wherein the scene is represented by a set of concentric circle mosaics based on a set of concentric circles, wherein the view renderer is further to generate values for a portion of one of the pair of rendered view images by interpolating between at least two captured images based on a constant distance to objects in the scene, and wherein the constant distance is calculated based on both a first distance between a center of the set of concentric circles and a nearest object of the scene and a second distance between the center of the set of concentric circles and a farthest object of the scene.

50. A system as recited in claim 49, wherein the constant distance is calculated as the average of the first and second distances.

51. A method for generating stereo view images of a scene for display, the method comprising:
generating, based on a set of concentric mosaics representing the scene, a pair of rendered view images of the scene from an observer viewpoint within a circular region defined by at least one of the set of concentric mosaics.

52. A method as recited in claim 51, wherein the set of concentric mosaics have been previously captured using one or more cameras.

53. A method as recited in claim 51, wherein the scene is a synthesized scene.

54. A method as recited in claim 51, wherein each of the rendered view images is comprised of a set of slit images, and wherein generating each of the rendered view images comprises:
ascertaining which of the slit images needed for the rendered view image coincide with a previously captured slit image;
ascertaining which of the slit images needed for the rendered view image do not coincide with one of the captured slit images;
generating, using linear interpolation based on a constant distance to objects in the scene, slit images needed for the rendered view image from pairs of captured slit images whenever a slit image needed for the rendered view image does not coincide with one of the captured slit images using linear interpolation; and
placing the captured slit images ascertained to coincide with slit images needed for the rendered view image, and the generated slit images, in a side-by-side arrangement so as to collectively form an image of a portion of the scene which represents the rendered view image.

55. A method as recited in claim 51, wherein
one of the pair of rendered view images is constructed using a first point of view;
another of the pair of rendered view images is constructed using a second point of view; and
the first point of view and the second point of view are geometrically related by a predetermined distance.

56. A method as recited in claim 55, wherein the predetermined distance is user-changeable.

57. One or more computer-readable memories containing a computer program that is executable by a processor to perform the method recited in claim 51.

* * * * *